Patented Feb. 22, 1944

2,342,385

UNITED STATES PATENT OFFICE 2,342,385

CARBALKOXYLATION OF ORGANIC COMPOUNDS

Vernon H. Wallingford, Ferguson, and August H. Homeyer, St. Louis, Mo., assignors to Mallinckrodt Chemical Works, St. Louis, Mo., a corporation of Missouri No Drawing. Application January 23, 1941, Serial No. 375,614

22 Claims. (Cl. 260—464)

This invention relates to carbalkoxylation of organic compounds, and with respect to certain more specific features, to the introduction of carbalkoxy groups into nitriles.

This application is a continuation-in-part of our copending application, Serial No. 287,001, filed July 28, 1939.

Among the several objects of the invention may be noted the provision of a general process for bringing about a carbalkoxylation of the type indicated, which is characterized by its high yield, its inexpensive and readily procurable reaction materials, and the facility with which it may be carried out. Other objects will be in part obvious and in part pointed out hereinafter.

The invention accordingly comprises the steps and sequence of steps, and features of synthesis, analysis, or metathesis, which will be exemplified in the processes and products hereinafter described, and the scope of the application of which will be indicated in the following claims.

While the process of the present invention provides primarily for the introduction of a carbalkoxy group into a nitrile, it also, in many instances, produces the carbalkoxylated product in the form of a highly reactive metallo derivative which readily lends itself to further steps of synthesis. This metallo compound may be then directly alkylated by the well-known procedures, or if the mono-substituted compound is desired, the metallo group may be replaced by hydrogen in the usual fashion. The metal of such a group is usually and preferably one of the alkali metals.

Broadly speaking, the process of the present invention comprises the carbalkoxylation of nitriles through the interaction of a nitrile, a dialkyl carbonate, and a metal alcoholate, in the dialkyl carbonate, and preferably in substantial excess, as the reaction medium. This may be represented by the following equation:

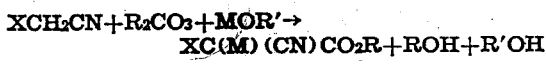

where X is the residue of the compound to be carbalkoxylated, and may be hydrogen, R is the alkyl of the dialkyl carbonate, M is an alkali metal, and R' is the radical of the alcoholate.

While the reaction is preferably carried out with a symmetrical dialkyl carbonate as shown in the equation, it can be carried out with an unsymmetrical dialkyl carbonate. In such cases, a mixture of carbalkoxylated compounds and product alcohols may be formed.

The mechanism of the reaction involved in the process of the present invention has not yet been definitely established. The large excess of dialkyl carbonate which is preferred, appears, however, to be an important factor.

The reaction may be pushed to substantial completion by heating as it progresses, to distill off the product alcohols (ROH and R'OH in the above equation). In case the original metal alcoholate contains alcohol, such alcohol is likewise removed by this distillation procedure. This procedure, while somewhat optional, is highly advantageous in its improvement in the yield of carbalkoxylated compound obtained.

Where the intended use of the sodio or other alkali metal compound is the preparation therefrom of an alkyl substituted compound, the sodio compound need not be recovered from the residue as such, but the residue may be alkylated to form the alkylated compound which may then be recovered from the reaction mixture. On the other hand, if the mono-substituted compound is desired, the sodio group, for example, may be replaced by hydrogen by any suitable method, for example, by acidification.

The following examples illustrate certain specific embodiments of the present invention, but are intended to be by way of example only:

EXAMPLE 1

Phenylacetonitrile

Sodium (4.7 g.) was added to anhydrous ethyl alcohol (100 ml.) in a 500 ml., three-necked flask, attached to a fractionating column. When the reaction was complete the flask was heated with an oil bath at 100° C. and the pressure was arranged at 120 mm. for ¾ hour to distill out most of the excess alcohol. The mixture was cooled to 30° C. and diethyl carbonate (125 ml.) was added. Then the distillation was continued at a bath temperature of 70° C. and a pressure of 50 mm. until only 30 ml. of alcohol remained in the mixture.

The mixture was cooled and phenylacetonitrile (23.4 g.) was added in portions with thorough shaking. After fifteen minutes, the flask was again attached to the column and was heated with the oil bath to 80–100° C. The pressure was reduced to 120 mm. and during two hours ethyl alcohol (44 ml.) was fractionated out. The mixture was then cooled and decomposed with acetic acid and water. The organic layer was separated, washed free of acid, dried and then fractionated. A yield of 78% (29 g.) of ethyl alpha-cyano-phenylacetate, boiling point 125–126° C. at 2-3 mm., and n 24/D 1.5017, was obtained. The ester was identified by reacting it with ammonia to obtain alpha-cyanophenylacetamide, which melted at 148-149° C., and by nitrogen assay, which showed 7.6% (theory 7.4%).

EXAMPLE 2 p-Methylphenylacetonitrile

Sodium (6.7 g.) was added to anhydrous ethyl alcohol (150 ml.) in a 500 ml., three-necked flask, arranged with a sealed stirrer, an oil bath and a fractionating column. When the reaction was complete the bath was heated to 90-100° C. and the pressure was reduced to 150 mm., and alcohol (80 ml.) was distilled out. The flask was then cooled and diethyl carbonate (250 ml.) was added. The distillation was then continued as above until all of the alcohol had been fractionated out. The mixture was cooled and p-methylphenylacetonitrile (37 g.) was added during one-half hour. During the addition the flask was cooled with a water bath at 20° C. and the mixture was stirred.

The flask was then heated with an oil bath at 90° C. and the pressure was reduced to 150 mm., and during 1½ hours a distillate (43 cc.), mostly alcohol, was fractionated out. The mixture was cooled and worked up as in Example 1. A yield of 87% (48 g.) of ethyl alphacyano-p-methylphenylacetate, boiling point 120-121° C. at 1 mm., and n 20.5/D 1.5046-1.5048, was obtained. This compound was identified by analysis; found, carbon 70.9% (theory 70.8%), hydrogen 6.5% (theory 6.4%) and nitrogen 7.0% (theory 6.9%). By reacting it with ammonia there was obtained alpha-cyano-p-methylphenylacetamide, melting at 167-168° C.

EXAMPLE 3 p-Iodophenylacetonitrile

A mixture was made of sodium ethylate (13.6 g.) and diethyl carbonate (250 ml.) as described in Example 2. The mixture was stirred and, at 50° C., a solution of p-iodophenylacetonitrile (48 g.) in diethyl carbonate (50 ml.) was added. The bath was heated at 100-110° C. and the pressure was arranged at 150 mm., and during two hours there was fractionated out 25 ml. of distillate, mostly alcohol. The mixture was worked up as described in Example 1. A yield of 50% (35 g.) of ethyl alphacyano-p-iodophenylacetate, boiling point 160° C. at 2 mm., was obtained. It was identified by iodine and nitrogen assays; found 40.5% iodine (theory 40.3%) and 4.4% nitrogen (theory 4.4%).

EXAMPLE 4

Acetonitrile

A mixture was made of sodium ethylate (34 g.) and diethyl carbonate (300 ml.) as described in Example 2. The mixture was cooled to room temperature, and acetonitrile (21 g.) was added. The bath was heated to 140-160° C. and ethyl alcohol (80 ml.) was fractionated out during 1½ hours. The mixture was then cooled and ether (300 ml.) was added. A fine, granular solid readily settled out of the suspension. The liquor was decanted. The solid was washed twice by decantation with 300 ml. portions of ether. The solid was then suspended in ether and concentrated hydrochloric acid (32 ml.) was added in small portions with shaking. After thorough shaking the ether solution was decanted and filtered, dried with sodium sulfate and filtered again. The ether was distilled off on the steam bath and the residue was vacuum fractionated. A yield of 10% (5 g.) of ethyl cyanoacetate, boiling point 106-107° C. at 22 mm., was obtained. This product was identified by reacting it with ammonia to form cyanoacetamide, which melted at 119-121° C.

EXAMPLE 5

Butyronitrile

A mixture was made of sodium ethylate (24.5 g.) and diethyl carbonate (300 ml.) as described in Example 2. The mixture was stirred and, at 80° C., butyronitrile (25 g.) was added. The bath was heated to 150-155° C. and the mixture was refluxed in the column for fifteen minutes. Then, during three hours, alcohol (35 ml.) was slowly fractionated out. The mixture was then cooled and worked up as described in Example 1. A yield of 43% (22 g.) of ethyl alpha-cyanobutyrate, boiling point 109-110° C. at 24 mm., n 20/D 1.4174-1.4186, was obtained. This compound was identified by hydrolyzing it to obtain ethylmalonic acid, which melted at 112°-113° C.

EXAMPLE 6

Isovaleronitrile

A mixture was made of sodium ethylate (29.9 g.) and diethyl carbonate (300 ml.) as described in Example 2. The mixture was stirred and, at 30° C., isovaleronitrile (35 g.) was added. The bath was heated to 150-155° C. and, during 3.5 hours, alcohol (43 ml.) was fractionally distilled out. The mixture was cooled and worked up as described in Example 1. A yield of 47% (31 g.) of ethyl alpha-cyano-isovalerate, boiling point 111-113° C. at 22 mm., n 20/D 1.4215-1.4230, was obtained. This compound was identified by hydrolyzing it to obtain isopropyl-malonic acid, which melted at 85-88° C.

EXAMPLE 7

Capronitrile

A mixture was made of sodium ethylate (34 g.) and diethyl carbonate (300 ml.) as described in Example 2. The bath temperature was raised to 150-155° C. and, during one hour, capronitrile (47.5 g.) was added. After one-half hour of the addition the fractional distillation of alcohol was started. During the total distillation period of 3½ hours, 60 ml. of alcohol was obtained. Then the mixture was cooled and worked up as in Example 1. There was obtained a 54% (41 g.) yield of ethyl alpha-cyanocaproate, boiling point 128-129° C. at 23 mm. This product was identified by hydrolyzing it to obtain n-butylmalonic acid, which melted at 102-103° C.

EXAMPLE 8

Iso-capronitrile

Potassium (20 g.) was dissolved in n-propyl alcohol (125 ml.) in a 500 ml. three-necked flask. Excess propyl alcohol was distilled off and the residue was heated at reduced pressure until the potassium propylate was substantially free of alcohol. After cooling, di-n-propyl carbonate (350 ml.) and iso-capronitrile (49 g.) were added and the flask was fitted with a mechanical stirrer and connected to a packed column arranged for distillation under reduced pressure. The reaction mixture was stirred and heated and propyl alcohol was removed as distillate at the head of the column at 51–54° C. at 100 mm.

When no more propyl alcohol was obtainable as distillate the reaction mixture was cooled and poured onto ice and acetic acid (35 ml.). The organic layer was separated, washed with water, dried over calcium chloride and distilled through an indented column at reduced pressure. After removing excess dipropyl carbonate the product, n-propyl alpha-cyano-iso-caproate, was obtained boiling at about 78–80° C. at 1.5 mm. The index of refraction was about n 25/D 1.4262. The yield was 66 g., or 72% of the theoretical based on iso-capronitrile.

The identity of the product was established by ammonolysis to alpha-cyano-iso-caproamide. A sample of the product (2 ml.) was shaken with concentrated ammonia (5 ml.) and a little alcohol. After two days the reaction mixture was diluted with water and extracted with ether. The ether extract was evaporated to dryness and the residue was recrystallized from petroleum ether, yielding plates of alpha-cyano-iso-caproamide, melting point 101–103° C.

EXAMPLE 9

*Stearonitrile*

Sodium (4 g.) was dissolved in anhydrous ethyl alcohol (100 ml.) in a 500 ml., three-necked flask. Excess alcohol was distilled off and the residue of sodium ethylate was heated at about 130° C. and at a pressure of about 30 mm. until the sodium ethylate was substantially free of alcohol. After cooling, diethyl carbonate (250 ml.) and commercial stearonitrile (40 g.) were added and the flask was fitted with a mechanical stirrer and attached to a packed fractionating column. The reaction mixture was stirred and refluxed at atmospheric pressure and alcohol was removed as distillate at the head of the column. When no more alcohol was obtainable, the reaction mixture was cooled, acidified with acetic acid (12 ml.) and poured into ice water. The organic layer was separated, washed with water, dried and distilled. After the excess diethyl carbonate had been removed the product was distilled from a Claisen flask at reduced pressure. Ethyl alpha-cyanostearate (36.7 g.) distilled chiefly at 167–180° C. at 2 mm., and its melting point was about 14–18° C. The index of refraction of the liquid was about n 27/D 1.4460.

The identity of the product was established by hydrolyzing a 10 g. sample with a solution of potassium hydroxide (2 g.) in alcohol (40 ml.) at room temperature. After about an hour the reaction mixture was diluted with water and extracted with ether. The aqueous phase was acidified with excess hydrochloric acid and extracted with ether. The ether extract was evaporated to dryness and the residue was crystallized from a mixture of acetic acid and petroleum ether, yielding alpha-cyanostearic acid, melting point 82–83° C.

Carrying out the above carbalkoxylations without the simultaneous removal, by distillation, of the alcohols produced in the reactions, is entirely feasible, but the yield is somewhat decreased.

The foregoing examples may be carried out if desired by placing the dialkyl carbonate and the nitrile in a flask under a reflux, and then gradually dropping in the metal alcoholate which is preferably dissolved in alcohol. Simultaneously the alcohol is preferably taken off as a distillate at the head of the column.

If desired, the reactions described herein may be carried out at atmospheric pressure, rather than under reduced pressure. The selection of operating pressures is determined merely by manipulative convenience, in most instances.

In general, it is preferred that the alkyl carbonate and the metal alcoholate shall contain the same alkyl groups in order to be certain that a mixture of products will not be obtained.

In view of the above it will be seen that the several objects of the invention are achieved and other advantageous results attained.

As many changes could be made in the above processes and products without departing from the scope of the invention, it is intended that all matter contained in the above description shall be interpreted as illustrative and not in a limiting sense.

What is claimed is:

1. The method for the carbalkoxylation of a nitrile of the type $XCH_2CN$, in which X is selected from hydrogen and aryl, alkyl and mixed aryl-alkyl radicals, which comprises reacting said nitrile with an alcoholate of an alkali metal and a dialkyl carbonate.

2. The method for the carbalkoxylation of a nitrile of the type $XCH_2CN$, in which X is selected from hydrogen and aryl alkyl and mixed aryl-alkyl radicals, which comprises reacting said nitrile with an alcoholate of an alkali metal and a substantial excess of dialkyl carbonate.

3. The method for the carbalkoxylation of a nitrile of the type $XCH_2CN$, in which X is selected from hydrogen and aryl alkyl and mixed aryl-alkyl radicals, which comprises reacting said nitrile with a substantially alcohol-free alcoholate of an alkali metal and a dialkyl carbonate.

4. The method for the carbalkoxylation of a nitrile of the type $XCH_2CN$, in which X is selected from hydrogen and aryl alkyl and mixed aryl-alkyl radicals, which comprises reacting said nitrile with a substantially alcohol-free alcoholate of an alkali metal and a dialkyl carbonate, and continuously removing alcohol from the reaction mixture.

5. The method for the carbalkoxylation of a nitrile of the type $XCH_2CN$, in which X is an aryl radical, which comprises reacting said nitrile with an alcoholate of an alkali metal and a dialkyl carbonate.

6. The method for the carbalkoxylation of a nitrile of the type $XCH_2CN$, in which X is an alkyl radical, which comprises reacting said nitrile with an alcoholate of an alkali metal and a dialkyl carbonate.

7. The method for the carbalkoxylation of phenylacetonitrile, which comprises reacting said compound with diethyl carbonate and sodium ethylate.

8. The method for the carbalkoxylation of butyronitrile, which comprises reacting said compound with diethyl carbonate and sodium ethylate.

9. The method for the carbalkoxylation of stearonitrile, which comprises reacting said compound with diethyl carbonate and sodium ethylate.

10. Ethyl alpha-cyanostearate.

11. The method for the carbalkoxylation of phenyl acetonitrile, which comprises reacting said compound with an alcoholate of an alkali metal and a dialkyl carbonate.

12. The method for the carbalkoxylation of stearonitrile, which comprises reacting said compound with an alcoholate of an alkali metal and a dialkyl carbonate.

13. The method for the carbalkoxylation of butyronitrile, which comprises reacting said compound with an alcoholate of an alkali metal and a dialkyl carbonate.

14. The method for the carbalkoxylation of phenyl acetonitrile, which comprises reacting said compound with an alcoholate of an alkali metal and a substantial excess of a dialkyl carbonate.

15. The method for the carbalkoxylation of stearonitrile, which comprises reacting said compound with an alcoholate of an alkali metal and a substantial excess of a dialkyl carbonate.

16. The method for the carbalkoxylation of butyronitrile, which comprises reacting said compound with an alcoholate of an alkali metal and a substantial excess of a dialkyl carbonate.

17. The method for the carbalkoxylation of phenyl acetonitrile, which comprises reacting said compound with a substantially alcohol-free alcoholate of an alkali metal and a dialkyl carbonate.

18. The method for the carbalkoxylation of stearonitrile, which comprises reacting said compound with a substantially alcohol-free alcoholate of an alkali metal and a dialkyl carbonate.

19. The method for the carbalkoxylation of butyronitrile, which comprises reacting said compound with a substantially alcohol-free alcoholate of an alkali metal and a dialkyl carbonate.

20. The method for the carbalkoxylation of phenyl acetonitrile, which comprises reacting said compound with a substantially alcohol-free alcoholate of an alkali metal and a dialkyl carbonate, and continuously removing alcohol from the reaction mixture.

21. The method for the carbalkoxylation of stearonitrile, which comprises reacting said compound with a substantially alcohol-free alcoholate of an alkali metal and a dialkyl carbonate, and continuously removing alcohol from the reaction mixture.

22. The method for the carbalkoxylation of butyronitrile, which comprises reacting said compound with a substantially alcohol-free alcoholate of an alkali metal and a dialkyl carbonate, and continuously removing alcohol from the reaction mixture.

VERNON H. WALLINGFORD.
AUGUST H. HOMEYER.